(No Model.)

R. CLARKE.
PLUMBER'S TRAP.

No. 285,574. Patented Sept. 25, 1883.

WITNESSES:
W. H. Knight
H. E. Hansmann

Robert Clarke,
INVENTOR:

Charles E. Foster
Attorney.

UNITED STATES PATENT OFFICE.

ROBERT CLARKE, OF BROOKLYN, NEW YORK.

PLUMBER'S TRAP.

SPECIFICATION forming part of Letters Patent No. 285,574, dated September 25, 1883.

Application filed January 6, 1883. (No model.)

*To all whom it may concern:*

Be it known that I, ROBERT CLARKE, a citizen of the United States, and a resident of Brooklyn, in the county of Kings and State of New York, have invented certain new and useful Improvements in Traps, of which the following is a specification.

My invention relates to the manufacture of traps of soft metal; and it consists in the mode of forming the same, and appliances for carrying out such mode, whereby the cost of manufacture and the length of time required to make the traps are greatly reduced, while the product is stronger and more durable than those made in the ordinary manner.

Figure 1:
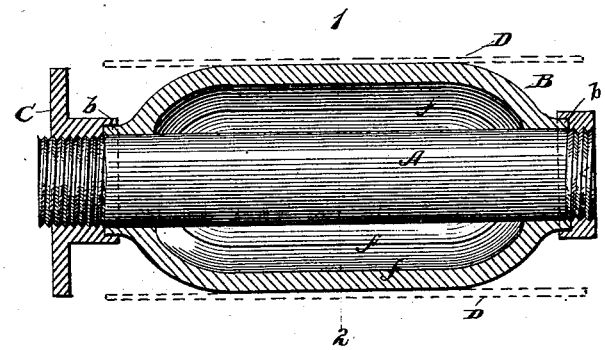
Figure 3:
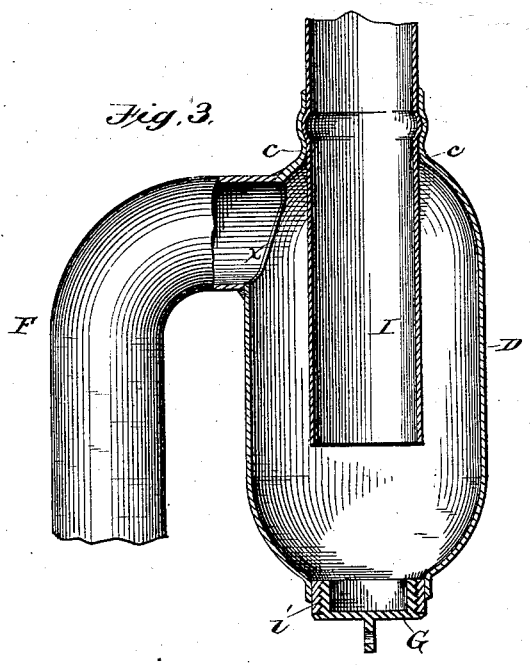
Figure 2:
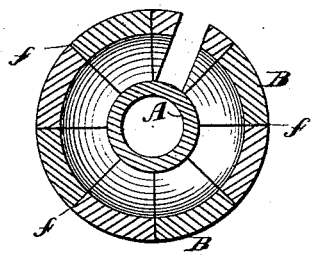

In the drawings, Figure 1 is a sectional view, illustrating the former upon which the traps are made. Fig. 2 is a transverse section on line 1 2, Fig. 1, with one section of the "former" removed; and Fig. 3 is a longitudinal section of the trap completed.

It has heretofore been customary to form soft-metal traps either by casting the same or by beating up the bodies by hand and soldering them to the inlet-pipes. The first process results in the production of traps which are porous and liable to permit the escape of gas. The second is expensive in consequence of the length of time consumed. To avoid the difficulties appertaining to both these modes, I spin the body of the trap from sheet metal, drawing down the ends of the cylinder, and then connect the inlet and outlet pipes thereto. By this means I condense the metal so as to prevent the passage of gases, while the body is formed to the proper shape in one-tenth of the time required to beat it into shape.

Different appliances may be used for carrying out this mode of manufacture. In the drawings I have shown a former, B, corresponding in shape to the body of the trap to be made, and consisting of sections *f*, fitted to a mandrel, A, and clamped thereto by means of a collar, C, screwed upon the mandrel and overlapping lips *b*, projecting from the sections. The mandrel is mounted in a lathe, a sheet or tube of soft metal is placed around the same, and the ends are spun down, so as to form a cylindrical body with rounded ends and a contracted opening at each end. The mandrel is then drawn from the former, the collar C being unscrewed, and the sections of the former are drawn out through one of the end openings. The body can be spun into shape in this manner in a few moments. The inlet-pipe I is now introduced into one end of the body and soldered thereto when it is in the proper position, and the pipe and the end or neck of the body are then swaged to form an annular collar or rib, *c*, which firmly unites the two, and at the same time hermetically seals the joint. An opening, *x*, is cut in one side of the body, and the outlet-pipe F is soldered thereto at this point. A metal ring, *i*, is soldered in the lower neck of the body, and is threaded to receive the detachable screw-plug G.

Where the trap is large, or of an unusual shape, the body may be spun up in sections of suitable size and form, which are then connected by pressure or soldering.

I reserve the right to claim in a separate application all patentable matters not herein claimed.

I claim—

1. The improvement in the art of manufacturing soft-metal traps, the same consisting in spinning the body of each trap into a cylinder with contracted open ends from a sheet of soft metal, and then connecting the inlet and outlet pipes to the ends of the body so formed, substantially as set forth.

2. A former for use in spinning the bodies of soft-metal traps, made in detachable sections with reduced ends, and adapted to be combined with a separable support, substantially as set forth, whereby a trap-body with contracted ends may be formed and the sections and supports separated and the former withdrawn through the contracted ends of the trap, as specified.

In testimony whereof I have signed my name to this specification in the presence of two subscribing witnesses.

ROBERT CLARKE.

Witnesses:
JOHN HARVEY,
THOMAS MORTIMER.